(12) United States Patent
Bauer et al.

(10) Patent No.: US 9,180,764 B2
(45) Date of Patent: Nov. 10, 2015

(54) HYDROSTATIC HYBRID DRIVE SYSTEM

(75) Inventors: Frank Bauer, Marpingen (DE); Herbert Baltes, Losheim (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 562 days.

(21) Appl. No.: 13/261,405

(22) PCT Filed: Mar. 21, 2011

(86) PCT No.: PCT/EP2011/001375
§ 371 (c)(1),
(2), (4) Date: Aug. 20, 2012

(87) PCT Pub. No.: WO2011/116914
PCT Pub. Date: Sep. 29, 2011

(65) Prior Publication Data
US 2012/0308404 A1 Dec. 6, 2012

(30) Foreign Application Priority Data
Mar. 22, 2010 (DE) .......................... 10 2010 012 975

(51) Int. Cl.
*B60K 6/12* (2006.01)
*F15B 1/02* (2006.01)
*F16H 61/433* (2010.01)

(52) U.S. Cl.
CPC . *B60K 6/12* (2013.01); *F15B 1/024* (2013.01); *F15B 2201/205* (2013.01);
(Continued)

(58) Field of Classification Search
CPC ..... B60K 6/12; F15B 1/024; F15B 2201/205; F15B 2201/31; F15B 2201/32; F15B 2211/20561; F15B 2211/20569; F15B 2211/212; F16H 61/433; Y02T 10/6208
See application file for complete search history.

(56) References Cited

U.S. PATENT DOCUMENTS 4,129,987 A * 12/1978 Blume ............................ 60/445
6,085,520 A * 7/2000 Kohno ............................ 60/414
(Continued)

FOREIGN PATENT DOCUMENTS

DE 35 18 434 A1 11/1986
DE 42 12 542 A1 10/1993
(Continued)

*Primary Examiner* — Dwayne J White
*Assistant Examiner* — Logan Kraft
(74) *Attorney, Agent, or Firm* — Wenderoth, Lind & Ponack, L.L.P.

(57) ABSTRACT

A hydrostatic hybrid drive system for road vehicles includes a pump/motor unit (1) connected to the powertrain of the vehicle, controlled by a control unit (5) in a pump or motor operation, and connected to a high-pressure hydraulic accumulator via a first working line (7). The first working line can be closed by a control valve (45) and connected to a low-pressure hydraulic accumulator via a second working line (9). The high-pressure hydraulic accumulator and low-pressure hydraulic accumulator are formed by a double-piston accumulator (11), in which a high-pressure side and a low-pressure side having respective accumulator pistons (15, 17) are formed in an accumulator housing (13). The fluid chambers (23, 25) of the high-pressure side and the low-pressure side are separated by a central housing part (21) through which the common piston rod for both accumulator pistons (15, 17) extends. The control unit (5) of the pump/motor unit (1) having a control area can be supplied from the first working line (7) via a line connection (59) provided on the first working line (7) between the pump/motor unit (1) and the control valve (45).

10 Claims, 3 Drawing Sheets

(52) U.S. Cl.
CPC ........ *F15B 2201/31* (2013.01); *F15B 2201/32* (2013.01); *F15B 2211/20561* (2013.01); *F15B 2211/20569* (2013.01); *F15B 2211/212* (2013.01); *F16H 61/433* (2013.01); *Y02T 10/6208* (2013.01)

(56) References Cited

U.S. PATENT DOCUMENTS

| | | | |
|---|---|---|---|
| 6,260,647 B1 * | 7/2001 | Calamari et al. | 180/179 |
| 6,584,769 B1 * | 7/2003 | Bruun | 60/414 |
| 7,107,767 B2 * | 9/2006 | Frazer et al. | 60/414 |
| 2008/0093152 A1 | 4/2008 | Gray | |
| 2009/0173066 A1 | 7/2009 | Duray | |

FOREIGN PATENT DOCUMENTS

| | | |
|---|---|---|
| DE | 10 2005 027 940 A1 | 1/2006 |
| DE | 601 18 987 T2 | 1/2007 |
| DE | 10 2005 060 994 A1 | 6/2007 |
| WO | WO 02/46621 A2 | 6/2002 |
| WO | WO 2007/122481 A2 | 11/2007 |

* cited by examiner

HYDROSTATIC HYBRID DRIVE SYSTEM

FIELD OF THE INVENTION

The invention relates to a hydrostatic hybrid drive system intended for road vehicles and comprising a pump/motor unit. The pump/motor unit is or can be connected to the drive train of the vehicle, can be controlled by a control unit in a pump or motor mode, and can be connected to a high pressure hydraulic accumulator by a first working line. The first working line can be closed by a control valve. A low pressure hydraulic accumulator is connected to the pump/motor unit by a second working line. The high pressure hydraulic accumulator and the low pressure hydraulic accumulator are formed by a double piston accumulator having a high pressure side and a low pressure side. Each side has an accumulator piston and is formed in an accumulator housing. The fluid chambers of the high pressure side and the low pressure side are separated by a central housing part through which the common piston rod for both accumulator pistons extends.

BACKGROUND OF THE INVENTION

In light of the scarcity of natural resources and the increasing impact of $CO_2$ on the environment, the current trend in automotive engineering is to use hybrid drive systems. The systems that are currently in use usually involve electric motor powered hybrids, which hybrids store the electric energy generated in braking modes and recover drive energy from the stored energy to provide assistance to the vehicle for the drive mode and, in particular, for acceleration processes. This strategy offers the possibility of decreasing the drive power of the internal combustion engine serving as the primary drive for comparable road performance. The result of such "downsizing" is not only a reduction in fuel consumption, but it also raises the possibility of assigning the vehicles concerned to a lower emissions class that satisfies a lower-cost road tax category.

These goals can also be achieved with a hydraulic hybrid system owing to the high energy density and the compact design of hydraulic systems. To make available additional drive torque even at low speeds and starting from zero speed for acceleration processes or to provide assistance to the braking action during braking modes, a hydraulic hybrid system stores the hydraulic energy in a hydraulic accumulator by a pump/motor unit. This hydraulic energy can then be used, as required, as the drive energy when the pump/motor unit is in motor mode. This hydrostatic drive system with recovery of the braking energy is disclosed in document DE 601 18 987 T2.

SUMMARY OF THE INVENTION

An object of the present invention is to provide an improved hydrostatic hybrid drive system that is distinguished by especially good operating behavior for the intended purpose.

This object is basically achieved with a drive system where the control unit of the pump/motor unit can be supplied with control fluid from the first working line by a line connection provided on the first working line between the pump/motor unit and the control valve. This feature guarantees that the control unit will be supplied in an operationally reliable way with the control pressure required for a fast reaction of the control functions of the control unit, independently of the respective operating mode.

In this context, an especially advantageous embodiment can provide that a non-return valve is disposed between the first and the second working lines. This non-return valve can be opened by pressure actuation in the direction of the first working line. The leakage fluid of the pump/motor unit can be delivered to the second working line. The leakage fluid can be delivered to the second working line by a charging pump. This feature can not only compensate for the leakage by pumping to the second working line, but it also allows the pressure level in the line, which line is protected by a pressure limiting valve, to be adjusted to a pressure level that is raised by a suitable amount that ensures that the control unit is supplied with a control pressure of a suitable pressure level from the first working line by the non-return valve disposed between the second working line and the first working line, even in the case of operating states in which the control valve is closed.

In advantageous embodiments, the control unit of the pump/motor unit can be supplied with filtered control fluid by a pressure reducing valve that has an upstream fluid filter and is connected to the first working line.

Preferably, the pump/motor unit is formed by an axial piston machine, which machine can be reversed between pump mode and motor mode by changing the pivot angle beyond the zero angle.

To reduce the pressure differential of the high pressure side of the double piston accumulator between the charged and the discharged state, an $N_2$ supply tank is connected, preferably to the gas side of the high pressure side of the double piston accumulator.

Since the system according to the invention has a low pressure level that is constant owing to the use of the double piston accumulator, this pressure can be adjusted by a small auxiliary accumulator that is connected to the second working line and that also compensates for compression losses.

An object of the invention is also a double piston accumulator that is provided, in particular, for use in a drive system.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
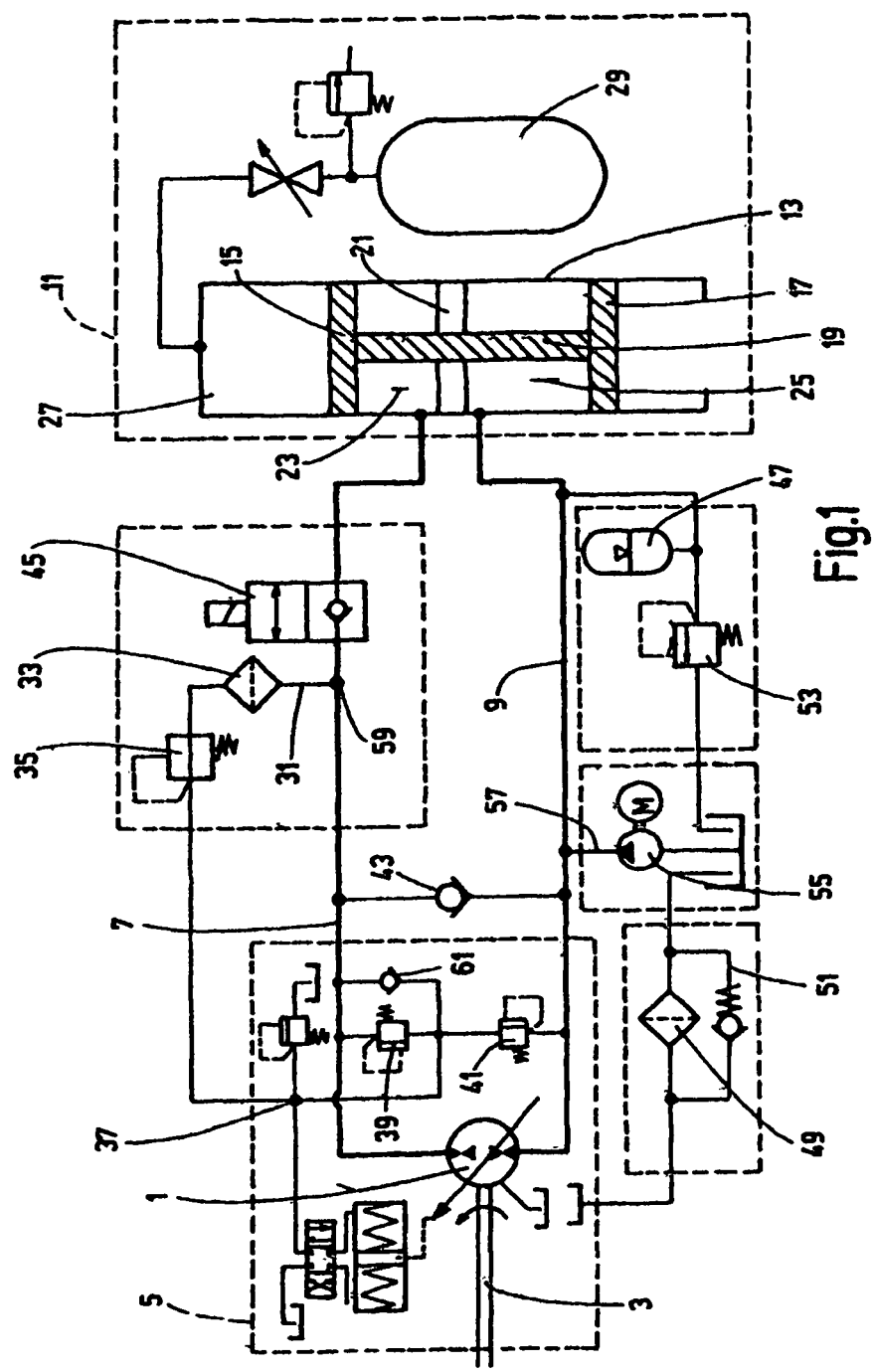
FIG. 1 is a highly simplified schematic diagram of a drive system hydraulic circuit according to an exemplary embodiment of the invention, without the peripheral components, such as the control units and the vehicle-side mechanical components.

FIG. 1 shows the hydraulic circuit of an embodiment having a pump/motor unit 1. This pump/motor unit is driven in a constant direction of rotation by an internal combustion engine of the vehicle concerned. This internal combustion engine, like the rest of the parts of the vehicle, is not depicted. In the present example, the pump/motor unit 1 is driven directly by the crankshaft 3 (depicted in schematic form) of the internal combustion engine. The pump/motor unit 1 is an axial piston machine having a pivot angle that can be adjusted beyond a neutral zero position in both pivotal directions by an electro-hydraulic control unit 5. The pump/motor unit 1 can then work in the pump mode and in the motor mode at a constant direction of rotation. The control unit 5 interacts with the vehicle's electronic engine management conforming to the prior art by an interface that is not depicted.

A first working line 7 is connected to the high pressure side of the pump/motor unit 1. A second working line 9 is connected to the low pressure side of the pump/motor unit 1. The first working line 7, as the high pressure line, and the second working line 9, as the low pressure line, form together with a double piston accumulator 11 a kind of hydraulic cradle, in which the pressure fluid can be conveyed to the double piston accumulator 11 and back from the double piston accumulator 11. The double piston accumulator 11 fulfills the functions of a high pressure accumulator and a low pressure accumulator. For this purpose, a common accumulator housing 13 is provided. A high pressure accumulator piston 15 and a low pressure accumulator piston 17 can be moved in the housing and are connected rigidly together by a common piston rod 19. The piston rod 19 extends through a central housing part 21 that separates a fluid chamber 23 of the high pressure side from a fluid chamber 25 of the low pressure side. To fill the gas side 27 that abuts the high pressure accumulator piston 15 with working gas, a supply tank 19 with $N_2$ gas is connected to the gas side 27.

To supply the control unit 5 with control fluid, a supply line 31 is connected to the first working line 7 to deliver filtered control fluid to a supply port 37 by a fluid filter 33 and a pressure limiting valve 35. At the same time, the control pressure level can be adjusted with respect to the first working line 7 and/or the second working line 9 by the pressure limiting valves 39 and 41. Between these working lines, a non-return valve 43 can be opened by pressure actuation in the direction of the first working line 7. To prevent the pump/motor unit 1 from leaking while the system is under no load at the pivot angle zero, the first working line 7 can be closed by a control valve 45.

Figure 2:
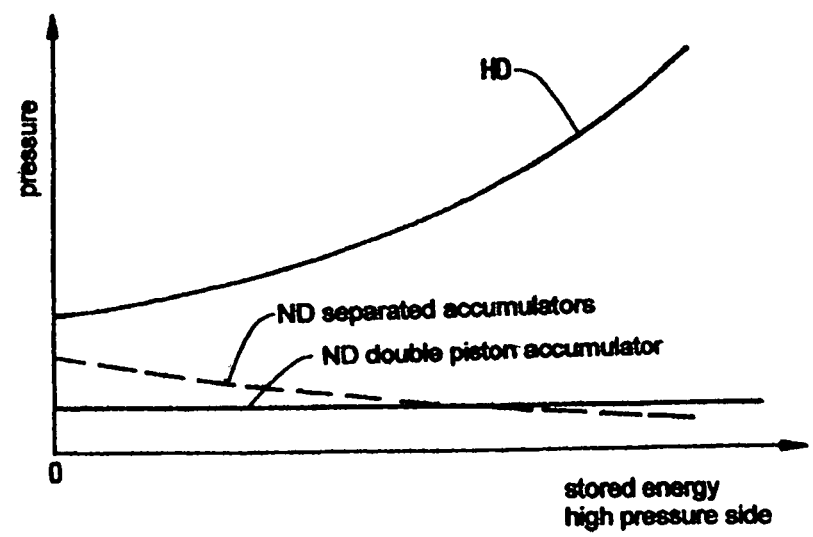
FIG. 2 is a graph representing the curve of the accumulator pressure levels.

When a drive system of the conventional type, in which first and second working lines are connected to separate hydraulic accumulators, which accumulators contain their own working gas volumes, is running, the pressure level of the low pressure accumulator drops as the pressure level of the high pressure accumulator rises. Replenishing the system with leakage fluid of the pump is then difficult. However, in the case of the double piston accumulator 11 provided according to the invention, the sum of the fluid volumes in the high pressure fluid chamber 23 and the low pressure fluid chamber 25 is always constant for all piston positions. Owing to the jointly movable accumulator pistons 15 and 17, the pressure level in the second working line 9—that is, the low pressure line—remains constant. FIG. 2 shows the respective pressure curves for the stored energy in separate hydraulic accumulators and for the double piston accumulator 11 provided according to the invention.

When the pressure level in the second working line 9 is constant, the pressure level can be adjusted to an optimal value by an attached, small auxiliary hydraulic accumulator 47 that also compensates for compression losses.

In the embodiment from FIG. 1, the leakage fluid of the pump 1 is delivered to the second working line 9 by a filter 49 with a bypass 51 and by a charging pump 55. Since the housing pressure of the pump 1 corresponds to the pressure level of the second working line 9, this second working line is protected by a pressure limiting valve 53 for safety reasons.

When an axial piston machine for closed loop operation is used as the pump/motor unit 1, the resulting higher flow losses make working with a higher low pressure level necessary. Since a higher pressure level is not admissible as the housing pressure of the pump, an additional leakage line has to be provided to protect the housing gasket from an overload. Pumps for closed loop operation also require a pressure differential between the housing and the low pressure side to hold the piston at the swivel plate. In view of this requirement, the embodiment from FIG. 1 has a small, electric motor driven charging pump 55 arranged in a separate line 57 to compensate for the leakage by pumping in the direction of the second working line 9. At this point, the housing pressure is uncoupled from the low pressure level.

At this point, the higher low pressure level in the second working line 9 offers the possibility of supplying the control unit 5 with control fluid from the second working line 9—that is, by way of the non-return valve 43. For this purpose, the pressure limiting valve 35 in a second exemplary embodiment is connected to the first working line 7 at a point 59 between the pump unit 1 and the control valve 45. This first working line 7 can deliver control fluid to the port 37 by way of the opened control valve 45, the filter 33 and the pressure limiting valve 35. When the non-return valve 43 is closed, a higher control pressure is made available now for the control unit 5.

Figure 5:
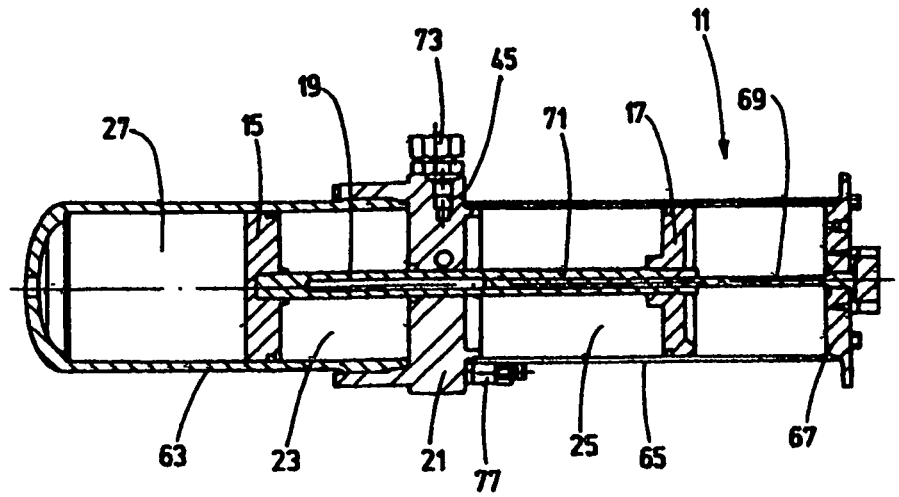
FIG. 5 is a side view of the double piston accumulator in section along line VI-VI of FIG. 4.
Figure 4:
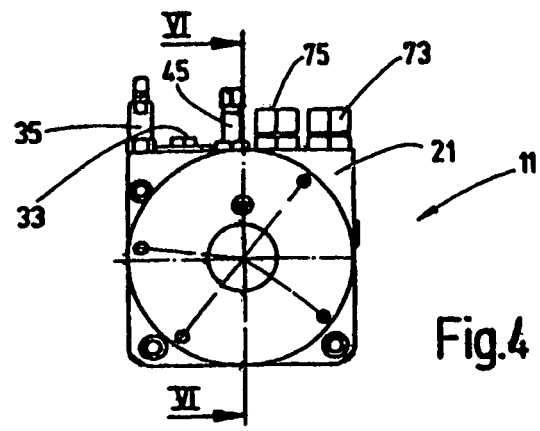
FIGS. 3 and 4 are a top view and a front view, respectively, of a double piston accumulator of the system according to an exemplary embodiment of the invention.
Figure 3:
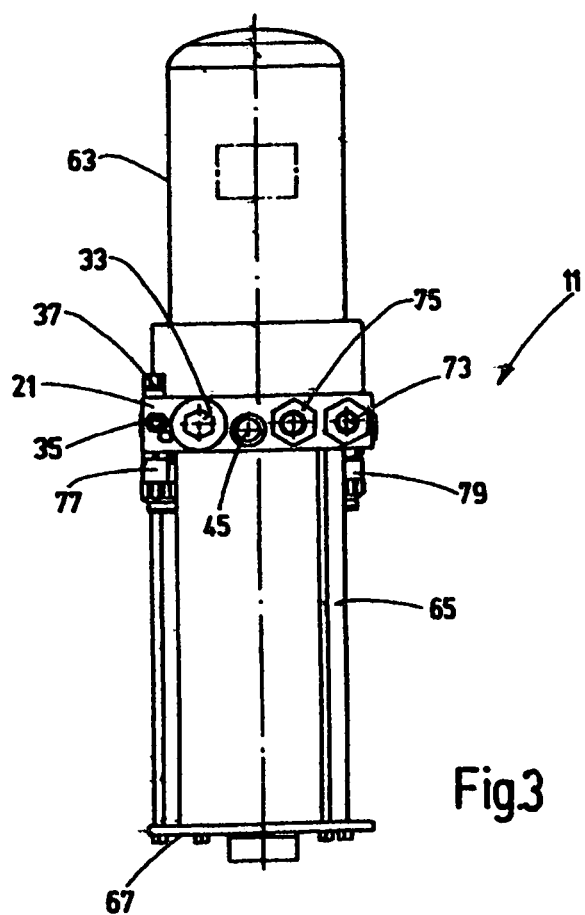

FIGS. 3 to 5 show a practical embodiment of the double piston accumulator 11, which accumulator has a common accumulator housing 13 for both accumulator pistons 15 and 17. The common accumulator housing has a high pressure side housing half 63 and a low pressure side housing half 65, both of which are separated from each other by a central housing part 21. The piston rod 19 connecting together the two pistons 15 and 17 in a rigid manner extends through the central part 21 with a fluid-tight seal. A position sensor 69 extends from the open end 67 of the low pressure side housing half 65 into an inside borehole 71 of the piston rod 19 to deliver an indication of the piston position for the system.

One special feature of the double piston accumulator 11 resides in the central housing part 21 forming a kind of valve block, at which and in which all of the line connections and other components are located. In this context, the illustrated example shows the ports 73 and 75 for a first working line 7 and a second working line 9, respectively. Furthermore, the central housing part 21 contains the control valve 45, the filter 33, the pressure limiting valve 35, the control fluid port 37 and the pressure sensors 77 and 79.

An additional advantage over the electric hybrid systems resides in the fact that the system according to the invention can be installed into existing vehicles without any difficulty, because the pump/motor unit 1 can be mechanically coupled directly to the drive train.

While various embodiments have been chosen to illustrate the invention, it will be understood by those skilled in the art that various changes and modifications can be made therein without departing from the scope of the invention as defined in the appended claims.

What is claimed is:

1. A hydrostatic hybrid drives system for road vehicles, comprising:
   a pump/motor unit connectable to a vehicle drive train;
   a control unit coupled to and controlling said pump/motor unit in pump and motor modes;
   a double piston accumulator including a housing having high and low pressure chambers with high and low pressure pistons therein, respectively, said housing having a central wall part separating said high and low pressure chambers, said high and low pressure pistons being connected by a common piston rod extending through said central wall part;

a first working line connecting said high pressure chamber to said pump/motor unit;

a line connection connected to said first working line and said control unit supplying control fluid to said control unit from said first working line;

a control valve in said first working line to open and close said first working line, said line connection being between said pump/motor unit and said control valve;

a second working line connecting said low pressure chamber to said pump/motor unit; and a fluid filter and a pressure reducing valve being connected in said line connection between said control unit and said first working line to supply filtered control fluid to said control unit from said first working line, said fluid filter being upstream of said pressure reducing valve.

2. A hydrostatic hybrid drive system according to claim 1 wherein a non-return valve is located in a line connecting said first and second working lines and is opened by pressure actuation in a direction of said first working line; and leakage fluid of said pump/motor unit is deliverable to said second working line via a charging pump connected to said second working line.

3. A hydrostatic hybrid drive system according to claim 1 wherein said pump/motor unit comprises an axial piston machine that is reversible between the pump mode and the motor mode by changing a pivot angle beyond a zero angle of said machine.

4. A hydrostatic hybrid drive system according to claim 1 wherein a $N_2$ supply tank is connected to a gas side of a high pressure side of said double piston accumulator.

5. A hydrostatic hybrid drive system according to claim 1 wherein an auxiliary hydraulic accumulator is connected to said second working line.

6. A hydrostatic hybrid drive system according to claim 1 wherein said second working line is connected to a pressure limiting valve to protect said second working line.

7. A hydrostatic hybrid drive system according to claim 1 wherein said central wall part comprises a valve block containing hydraulic components, said hydraulic components including said control valve, said pressure reducing valve and said fluid filter.

8. A hydrostatic hybrid drive system according to claim 7 wherein pressure sensors are located in said valve block.

9. A double piston accumulator for a vehicle hydrostatic hybrid drive system, comprising:

a common accumulator housing;

a high pressure side in said accumulator housing with a high pressure piston and a high pressure chamber in said high pressure side;

a low pressure side in said accumulator housing with a low pressure piston and a low pressure chamber in said high pressure side;

a central housing part separating said high pressure chamber and said low pressure chamber, a common piston rod extending through said central housing part connecting said high pressure piston and said low pressure piston; and a valve block formed by said central housing part containing a control valve, a pressure reducing valve and a fluid filter.

10. A double piston accumulator according to claim 9 wherein said valve block contains pressure sensors.

* * * * *